United States Patent [19]

Landowski et al.

[11] Patent Number: 4,924,307
[45] Date of Patent: May 8, 1990

[54] IMAGE PROCESSOR

[75] Inventors: Roger W. Landowski, Waukesha; Richard M. Roszkowski, Brookfield; Donald J. Christian, New Berlin; Assad A. Ansari, Bayside, all of Wis.

[73] Assignee: Allen-Bradley Company, Inc., Milwaukee, Wis.

[21] Appl. No.: 202,198

[22] Filed: Jun. 3, 1988

[51] Int. Cl.[5] .......................... H04N 7/18; H04N 17/00
[52] U.S. Cl. ..................................... 358/107; 358/139; 340/747; 324/121 R
[58] Field of Search ................. 358/107, 160, 93, 139; 340/722, 747; 324/121 R; 364/487, 518, 521; 382/8, 25, 67

[56] References Cited

U.S. PATENT DOCUMENTS

| | | | |
|---|---|---|---|
| 4,127,849 | 11/1978 | Okor | 340/747 |
| 4,129,858 | 12/1978 | Hara | 340/747 |
| 4,400,728 | 8/1983 | Long | 358/107 |
| 4,482,861 | 11/1984 | Tabovec et al. | 324/121 R |
| 4,546,384 | 10/1985 | Kowalski | 358/107 |
| 4,581,762 | 4/1986 | Lapidus et al. | 358/107 |
| 4,586,036 | 4/1986 | Thomason et al. | 358/139 |
| 4,783,827 | 11/1988 | Izumi | 382/18 |
| 4,805,019 | 2/1989 | Holliday | 358/107 |
| 4,809,189 | 2/1989 | Batson | 324/121 R |

Primary Examiner—John K. Peng
Attorney, Agent, or Firm—Quarles & Brady

[57] ABSTRACT

An image processor is divided into three sections for image acquisition and storage, image processing, and video output signal generation. The three sections are connected by an addrsss bus, a data bus and a set of control signal lines. A first bus control circuit is provided to isolate the image acquisition and storage section from the other sections during image acquisition and storage operations. A second bus control circuit isolates the video output section from the other sections, except during vertical and horizontal blanking intervals of the video output signal. The image is acquired by a line scan sensor which is clocked to acquire the image over one of several user definable exposure intervals. The video output presents the line scan sensor image in three formats. The first is a compressed representation of the entire line and the second is a less compressed representation of a selected portion of the image. The third display format is a binary version of the second image display format.

20 Claims, 13 Drawing Sheets

IMAGE PROCESSOR

The present invention relates to image signal processing systems for evaluating objects present in the image, and more particularly to such systems which process a signal from a line scan sensor.

BACKGROUND OF THE INVENTION

As automated assembly equipment and robots become more sophisticated, it is desirable to add the sense of vision to such devices. This would enable the equipment to locate the position of an object being manufactured, as well as to inspect the object for the presence of components or the proper location and size of specific features. To this end, various vision systems have been employed to generate a one or two dimensional electrical image of the workpiece which then can be electronically analyzed.

One of the problems that is often encountered in such vision systems is that they are relatively complex to set up and use. Typically, machine tools and other manufacturing equipment are operated by individuals who are not well versed in computer programming. Therefore, if the set up and analysis operations of the vision system requires significant computer programming steps, the equipment is not well suited for individuals whose primary skills lie in machine tool operation. It is therefore desirable to design a vision system which can be easily set up to analyze different types of workpieces and perform various decision making functions with respect to that analysis.

In addition, conventional programmable controllers which are employed to operate assembly lines and machine tools have input modules which are adapted to receive discrete input signals. Typically, such discrete input signals correspond to the opening or closing of a switch. Other ones of these input modules respond to an analog current, the magnitude of which varies in response to a sensed condition and then is evaluated by the control program of the programmable controller. Because of the large base of such installed programmable controllers, it is highly desirable to design a vision system which provides decision outputs that are compatible with the inputs to these existing controllers.

SUMMARY OF THE INVENTION

An image processor includes three sections for image acquisition and storage, image processing, and video output signal generation. The three sections are connected by an address bus, a data bus and a set of control signal lines. A first bus control circuit is provided to isolate the image acquisition and storage section from the other sections during image acquisition and storage operations. A second bus control circuit isolates the video output section from the other sections except during the vertical and horizontal blanking intervals of the video output signal. By enabling each section to be selectively isolated from the other sections, different operations can occur simultaneously.

In the preferred embodiment, the image is acquired by a charge coupled device (CCD) line scan sensor. This type of sensor has a plurality of imaging sites in which electric charges are accumulated that are proportional to the light striking the sites. The charges representing an image accumulate during a user definable exposure interval. At the end of the exposure interval, the charges are clocked out of the sensor and converted into digital image elements.

The image elements are evaluated by the processing section to detect selected characteristics of the linear image and to determine whether these characteristics fall within predefined tolerance ranges. The processing section converts the image elements from the sensor into video image data, which depict the sensed image and the results of the its evaluation.

The video output section uses the video image data to form a video signal, which in the preferred embodiment, presents the line scan sensor image in three formats. The first format is a compressed representation of the entire line and the second is a less compressed representation of a selected portion of the image. The third display format is a binary version of the second image display format. In addition, the preferred video output image includes several icons which allow the user to select different processor functions via a light pen.

The general object of the present invention is to provide an image processor which can rapidly acquire and analyze an image and output the analysis results.

In order to accomplish this general object of the present invention, it is an object to segmentize the image processor into sections that can simultaneously perform their operations with minimal affect on the operation of the other sections. However, this segmenting still permits data to be passed among the sections at times when their primary operating function will be least impacted.

Another object is to provide a video display of the processor operation for the user in several formats which graphically depict the image processing and the effects that changing processing parameters has on the processing.

Yet another object is to provide a mechanism by which a programmable image processor can be configured to acquire and analyze an image with minimal knowledge of computer programming.

DETAILED DESCRIPTION OF THE INVENTION

Figure 1:
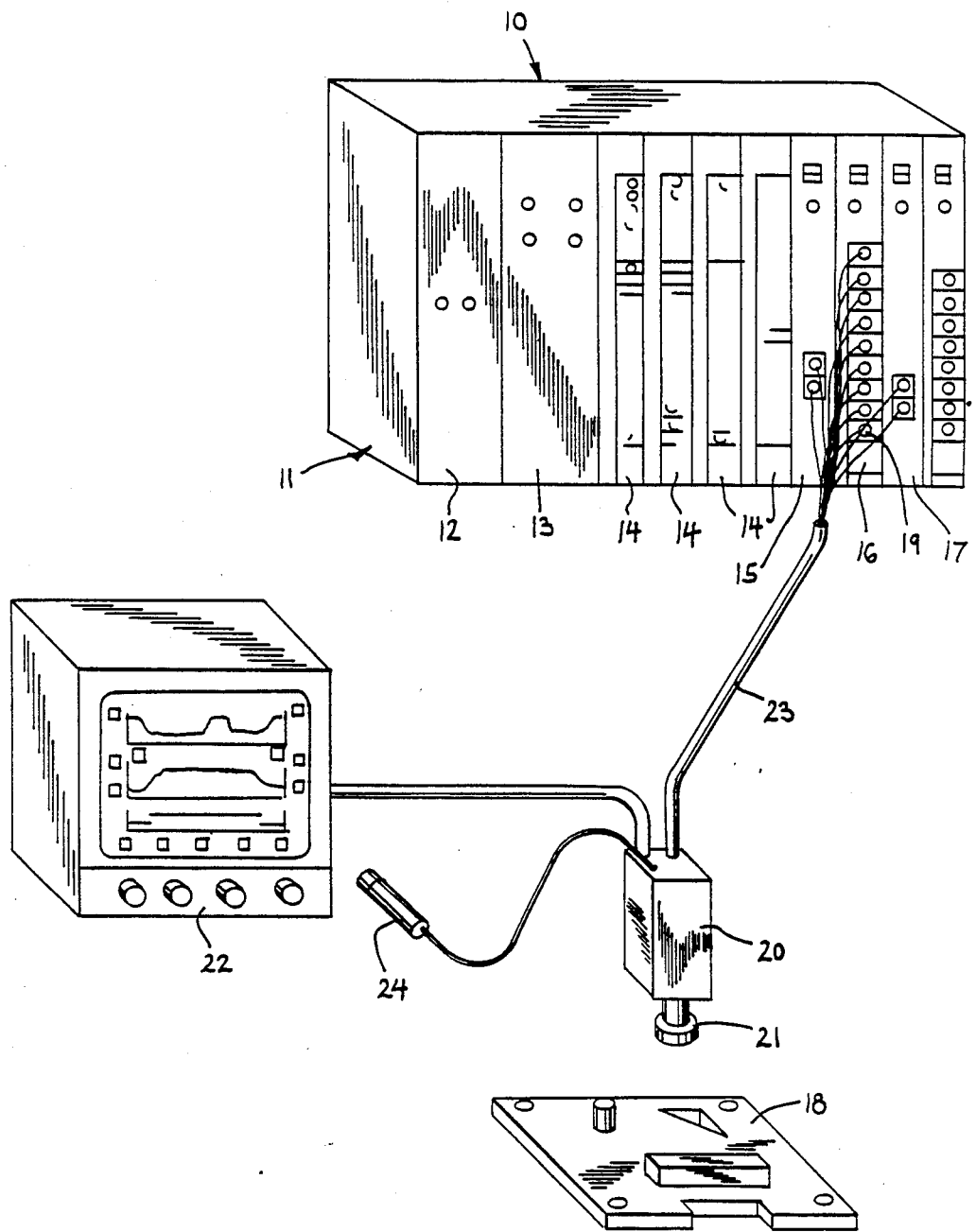
FIG. 1 is a pictorial representation of a programmable controller system which incorporates the present image processor.

FIG. 1 illustrates a conventional programmable controller 10, such as an Allen-Bradley 1771 Series System, which executes program instructions to operate a machine. The controller 10 includes a rack 11 in which a number of functional modules 14-17 are housed and interconnected by a mother board within the rack. The rack 11 includes a power supply 12 which provides electricity to each of the functional modules. A processor module 13 is provided in the rack which stores and executes a user defined control program to control the operation of a piece of manufacturing equipment. Located elsewhere in the rack 11 are a number of input/output (I/O) modules 14-17 which interface the processor module 13 to sensing and operating devices on the controlled machine. One of these is an analog input module 15 which receives data from a sensing device in the form of an analog current signal between four and twenty milliamperes. This input module 15 digitizes the analog signal for processing by the processor module 13. A conventional discrete dc input module 16 has input terminals 19 to which eight separate dc voltages are applied. Typically, each of these dc voltages represents the state of a sensor switch that responds to a given condition of the controlled machine. A serial communication module 17 also is included to provide serial data communication capability between the rack 11 and a remote device.

In the system shown in FIG. 1, the inputs to both the analog input module 15 and the dc input module 16 are coupled to the outputs from a line scan image processor 20. As shown in FIG. 1, the image processor 20 is positioned above a workpiece 18 so that features of the workpiece are focused by lens 21 onto a line scan sensor within the image processor. The workpiece 18 may be manually positioned beneath the image processor 20 or it may be moving along an assembly line (not shown). The image processor 20 produces a 256 by 256 pixel video image which is displayed on a monitor 22 coupled to the processor. The display on monitor 22 depicts the luminance levels of the image elements of the linear image from the line scan sensor and the results of the processing. As used herein, the term "image element" refers to the portion of the linear image which corresponds to each imaging site of a CCD image sensor in the processor 20 As will be used later, the term "pixel" refers to a picture element of a video image for monitor 22.

A light pen 24 has an output coupled to the processor 20 and is employed to select icons that are displayed on the screen of monitor 22. Once the image processor has been configured to evaluate a workpiece, the monitor 22 and the light pen 24 may be disconnected if further monitoring of the processor's operation is not required.

The image processor 20 produces a linear image of the workpiece which is digitized into a binary image. The user can define several image analysis line gauges similar to those described in U.S. Patent Application Ser. No. 7-057,797 filed on June 3, 1987 now U.S. Pat. No. 4,916,640. Each line gauge evaluates image elements in a selected portion of the binary linear image. For example, a line gauge can count the number of white or black image elements in the selected portion. The product of the evaluation is compared to predefined upper and lower limits and the result of the comparison is fed to the programmable controller 10 in either of two formats. The first is a binary decision bit representing whether a chosen evaluation product is within the upper and lower limits. This decision bit is applied to an input of the dc input module 16. The processor 20 also generates an analog current signal corresponding to the selected evaluation product. This analog signal is applied to the analog input module 15. The features and operation of the image processor 20 will be more fully described following a description of its circuitry.

Image Processor Circuitry

Figure 2:
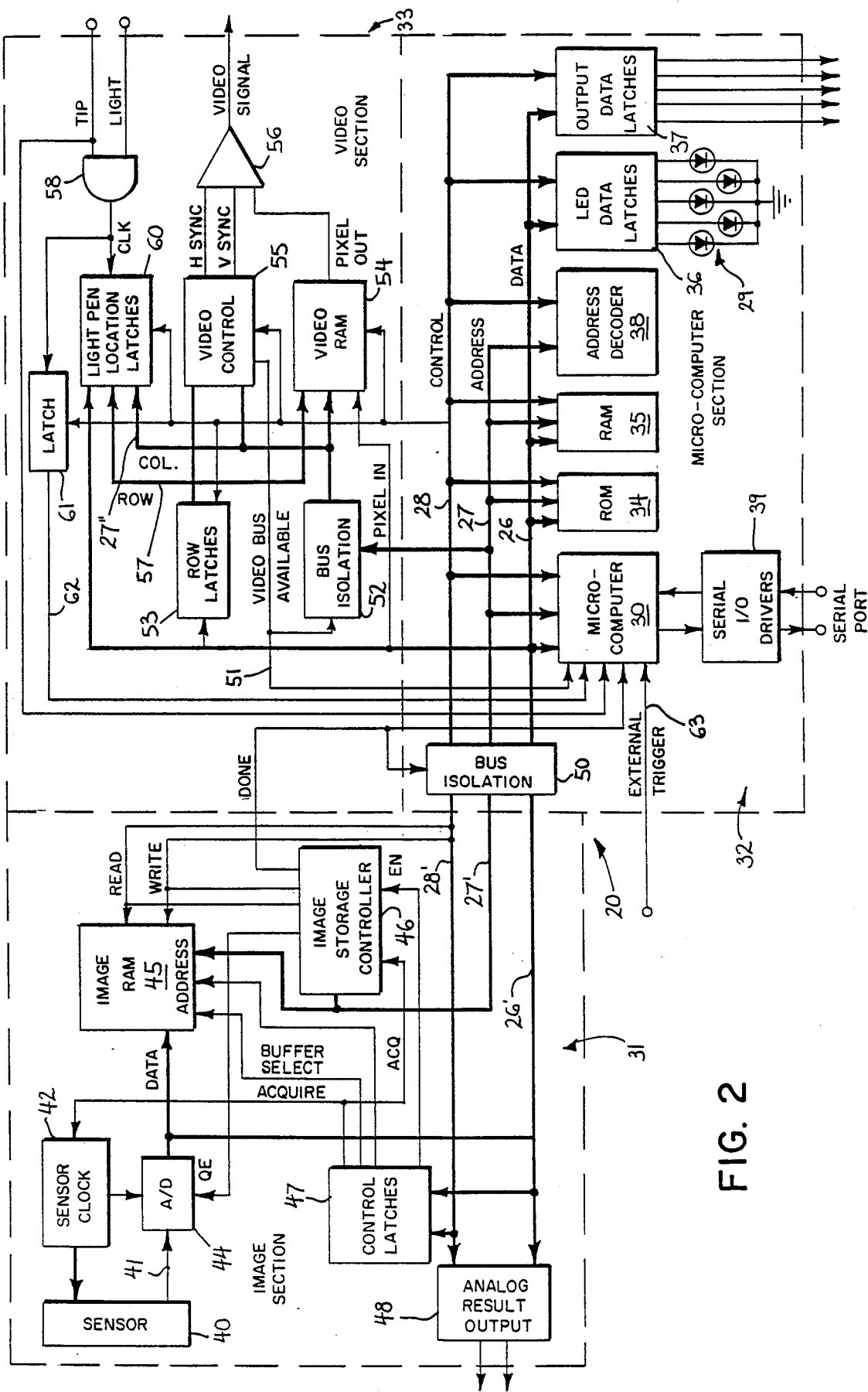
FIG. 2 is a schematic block diagram of the electrical circuit for the image processor.

The image processor 20 includes not only the line scan sensor, but all of the logic for interpreting the line scan image according to user defined parameters and for generating output signals representing the results of that interpretation. FIG. 2 illustrates the details of the circuitry for the image processor, which is subdivided into an image section 31, a microcomputer section 32 and a video section 33. Each of the three sections and their constituent components are interconnected by a set of three buses: an eight bit parallel data bus 26, an sixteen bit parallel address bus 27, and a bus of individual control lines 28 extending between various components of the image processor. As will be described, the portions of the buses within each processor section 31-33 can be isolated from the other bus portions allowing each of the sections to operate simultaneously without creating bus contention.

The microcomputer section 32 is built around a microcomputer 30, such as an MC68HC11 model manufactured by Motorola, Inc. The microcomputer includes not only a microprocessor core, but also a serial communication interface, on-chip memory, clock logic and timer circuits. The microcomputer 30 also provides several parallel I/O ports to which the lines of the three buses 26-28 as well as several discrete control signal lines are connected. The software program, which is executed by the microcomputer to analyze the image, is stored in a read only memory (ROM) 34 coupled to the buses 26-28 within the microcomputer section 32. A random access memory (RAM) 35 is also connected to the three buses to store user defined analysis parameters and the results of the image processing. Frequently used variables and constants can be stored in the memory within the microcomputer 30 instead of RAM 35 in order to decrease the time required to access these data.

Several indicator light emitting diodes (LED's) 29 are positioned on the outer case of the image processor 20 and are driven by outputs from a set of data latches 36. These LED's provide a visual indication to the user when the image processor 20 is busy, when the evaluation results are ready and when a fault occurs. The microcomputer section 32 also includes a set of binary output data latches 37. The state of two of these output data latches 37 represent pass/fail decision output bits indicating the results of user defined evaluations of the image. Other output latches 37 provide handshake and status signals, indicating fault conditions, processor busy and decision valid conditions. The outputs of data latches 37 are coupled by cable 23 (FIG. 1) to the dc input module 16. Alternatively, outputs of the microcomputer 30 can be directly coupled to driver circuits to provide the LED and data signals in place of the latches 36 and 37.

Most of the components accessable by the microcomputer are memory mapped. An address decoder 38 is located within the microcomputer section 32 and decodes selected addresses from the address bus 27 to generate control signals for the corresponding component of the image processor 20. The control signals from the address decoder 38 are coupled to the respective components via the control bus lines 28. For example, when data is to be stored within the LED data latches 36, the address decoder 38 recognizes the address on bus 27 and transmits signals to the LED data latches enabling them to store the bits which are present on the data bus 26.

As noted previously, the microcomputer 30 contains an onchip serial I/O interface. This interface is coupled to a set of serial I/O drivers 39 which translate the signal levels of the microcomputer to those of a conventional serial communication protocol, such as the RS-232 standard. The serial I/O drivers provide a serial port, which enables the image processor to be connected to the serial communication module 17 in the programmable controller 10. Several sets of configuration parameters may be archived in the memory of the programmable controller and, as needed, downloaded into the image processor 20 to configure it for a specific set of image analysis functions. In addition, a programmable controller 10 may communicate with the image processor 20 in order to obtain raw image analysis data and not just the conclusory decision bits and analog output signals.

The image section 31 contains the circuitry which acquires and stores the linear image for later analysis by the microcomputer 30. The image section contains a line scan image sensor 40, such as a model UPD799D manufactured by NEC, having 2,048 individual sensor imaging sites located along a single line, with each sensor site corresponding to an image element. The sensor 40 is a charged coupled device and can be activated to accumulate charge within the sensor imaging sites over a selectable period of time as defined by the user. The line scan image sensor contains internal shift registers which are clocked by a signal from a sensor clock 42 to produce an analog signal output on line 41 sequentially containing the luminance level of each image element. The sensor output line 41 is connected to the input of a flash analog-to-digital (A/D) converter 44 which is clocked by a signal from the sensor clock 42. The A/D converter 44 transforms the analog signal into a series of bytes, each representing the luminance of an image element as one of sixty-four digital gray scale levels. In response to an output enable signal OE, the digital gray scale luminance level is outputted onto a portion 26' of the data bus which extends into the image section 31.

The output from the A/D converter 44 is connected by this image section data bus 26' to the data terminals of an image RAM 45. The image RAM 45 is an 8K×8 static random access memory, thereby providing four separate sets of storage locations, referred to herein as four image buffers, in which a separate 2,048 pixel image can be stored. The eleven least significant bits of the address input for the RAM 45 are connected to a portion 27' of the address bus which is within the image section 31. The image section address bus 27' is also connected to the outputs of a image storage controller 46, which when enabled during image acquisition, steps the addressing of the image RAM 45 resulting in the image data from the sensor 40 being stored therein. The image storage controller 46 also produces a write control signal for the image RAM 45 and an output enable signal for the A/D converter 44.

A set of image control latches 47 are coupled to the image section data bus 26' and to a portion 28' of the control lines within the image section 31. The set of control latches 47 store data bits from the microcomputer 30 which place the image section 31 in different modes of operation, as will be described. Two of the control latches 47 store a pair of bits which select one of the four image RAM buffers for data storage or retrieval. The outputs of these control latches are connected to the two most significant address bit inputs of the image RAM 45. Another control latch 47 stores an acquire bit (ACQ) which when active causes the sensor clock 42 and the image storage controller 46 to acquire a new image. A fourth latch within the set of control latches 47 stores a image storage controller enable bit EN, which places the image RAM 45 in the write mode.

As noted previously, the image processor 20 produces an analog signal, the magnitude of which represents the results of a defined analysis on the acquired image. An analog result output circuit 48 within the image section 31 receives a digital number from data bus portion 26' that defines the magnitude for the analog output signal. The analog result output circuit 48 converts this digital number to a proportional analog current level. This output current is continuously applied through a pair of conductors of cable 23 to the analog input module 15 in FIG. 1.

With continuing reference to FIG. 2, the portions of the three processor buses 26-28 within the microcomputer section 32 are isolated from the portions 26'-28' of these buses within the image section 31 by a first bus isolation circuit 50. The first bus isolation circuit 50 comprises a set of tri-state bidirectional data buffers coupling the individual lines of the two portions of the data bus 26 and 26'. The address bus portions 27 and 27', and the control line portions 28 and 28' are similarly connected by other sets of tri-state data buffers so that the address and control signals from the microcomputer section 32 are coupled to the image section 31. The data buffers within the first bus isolation circuit 50 are rendered conductive by an active DONE signal from the image storage controller 46 upon the completion of an image acquisition cycle. This DONE signal is also coupled to an input terminal for microcomputer 30. By isolating the two portions of each of the processor buses, the image section 31 can use its bus portions 26' and 28' during the image acquisition, while the microcomputer 30 simultaneously uses the primary bus portions 26-28 for other functions.

The data and address buses and the control bus lines also extend from the microcomputer section 32 into the video section 33. A second bus isolation circuit 52, comprised of tri-state data buffers, couples the portion of the address bus 27 within the microcomputer section 32 to a portion 27" within the video section 33. The data bus 26 and the control lines 28 are coupled directly into the video section 33 without an isolation circuit.

The video section 33 contains a 64K×1 video RAM 54 in which is stored the data of the 256 by 256 pixel video image for the monitor 22. Each pixel of the video image is represented by a single bit defining whether the pixel is white or black. Each of these video pixel bits is sent from the microcomputer 30 over the least significant bit line of data bus 26 to the data input of the video RAM 35. As is conventional practice, the storage locations of the video RAM are mapped as a two dimensional matrix corresponding to the 256 columns and 256 rows of video image pixels stored therein. The eight least significant address input bits of the video RAM 54 are considered as the column address input and the eight most significant address input bits are considered as the row address input. As noted previously, the components of the image processor 20 are memory mapped using sixteen bit addresses. However, since the 64K video RAM would normally require all sixteen address bits just to access its storage locations, it is not directly memory mapped. Instead, the eight column address inputs of a video RAM 54 are coupled directly to the eight least significant bit lines of the video section address bus 27"; and the row address inputs are connected to a row address bus 57 which is coupled to the data bus 26 by a set of row latches 53. As a result of this connection, the microcomputer 30 accesses a given storage location in the video RAM 54 by first storing the most significant byte of the address (the row address) in row latches 53 and then sending the least significant address byte (the column address) over the address bus 27 and 27". With this technique only 257 addresses (256 column addresses and one row latch address) are required to access the 64K video RAM 54.

A video control circuit 55 produces properly timed control signals to generate a binary video image on the monitor 22 from data bits stored in the video RAM 54. Specifically, the video control circuit 55 generates the row and column address signals on buses 57 and 27", respectively, to sequentially clock each pixel bit out of the video RAM 54. The video RAM data output is connected to a video digital-to-analog (D/A) converter 56, which also receives horizontal and vertical synchronization signals from the video control circuit 55. In response to the pixel data and the synchronization signals, the video (D/A) converter 56 produces a conventional raster scan video signal, such as the NTSC standard in the United States, which is coupled to monitor 22.

During the line scan periods of the video signal, when the video control is addressing the video RAM, a inactive bus available signal is sent to the second bus isolation circuit 52 to decouple the video section address bus 27" from the address bus 27 in the microcomputer section 32. During the horizontal and vertical video blanking intervals, the video control 55 does not need to address the video RAM 54 and produces an active video bus available signal on line 51. During these intervals, the bus isolation circuit 52 is enabled by the video bus available signal to couple the address bus 27 within the microcomputer section 32 to the video section address bus 27". The active video bus available signal also indicates to the microcomputer 30 that it may access the video RAM 54 to store or read video image data. At the end of the respective horizontal or vertical blanking interval, the video control circuit 55 removes the active video bus available signal cutting off the microcomputer section address bus 27 from the video section address bus 27" so that the video control circuit 55 can once again access the video RAM 54 to generate the next video signal scan line.

The video section 33 also receives the output signals from the light pen 24. These signals include a signal produced by a switch within the light pen 24 when its tip is pressed against the screen of the cathode ray tube of monitor 22 and another signal is produced by the light generated when the electron beam of the cathode ray tube scans the portion of the screen against which the light pen is pressed. These two signals are connected to inputs of an AND gate 58 having an output applied to the clock input terminal of a set of light pen position latches 60. In response to an active clocking signal, the light pen position latches store the video RAM address bytes then present on the row address bus 57 and the video section address bus 27". The two bytes stored by the light pen position latches indicate the position of the light pen with respect to the image being displayed on the monitor 22. The output of the light pen AND gate 58 also triggers a light pen active latch 61 which produces an output signal on line 62 that is coupled to the microcomputer 30 to indicate that a new set of address bytes has been stored in the light pen position latches 60. The signal from the light pen tip is also applied directly to an input terminal of the microcomputer 30. In response to a signal on line 62, the microcomputer sequentially reads the row and column address bytes from the location latches 60 over the data bus 26 to determine the light pen's position. Once both light pen position latches 60 have been read, the light pen latch 61 is automatically cleared for the next light pen activation.

Selected ones of the control bus lines 28 also extend from the microcomputer section 32 into the video section 33 to provide the necessary component control signals, as will be described in a subsequent section explaining the operation of the image processor 20. For example, these control lines enable the microcomputer 30 to access latches 53, 60 or 61 and the video RAM 54.

Operation Overview

With the preceding description of the hardware in mind and with reference to FIG. 2, the primary functions of the image processor correspond to its three circuit sections: sensor image acquisition, sensor image analysis, and video image generation.

To acquire an image for processing, the imaging sites of the line scan sensor 40 accumulate charges which correspond to the amount of light striking those sites. Once the charges have accumulated for a user definable exposure interval, they are clocked out of the sensor, digitized and stored as grey scale luminance levels in the image RAM 45 for each image element. These operations are governed by the image storage control circuit 46 without intervention of the microcomputer 30 other than to initiate the process The microcomputer 30 then accesses the image RAM 45 to read out the image element luminance levels for processing and analysis.

Figure 3:
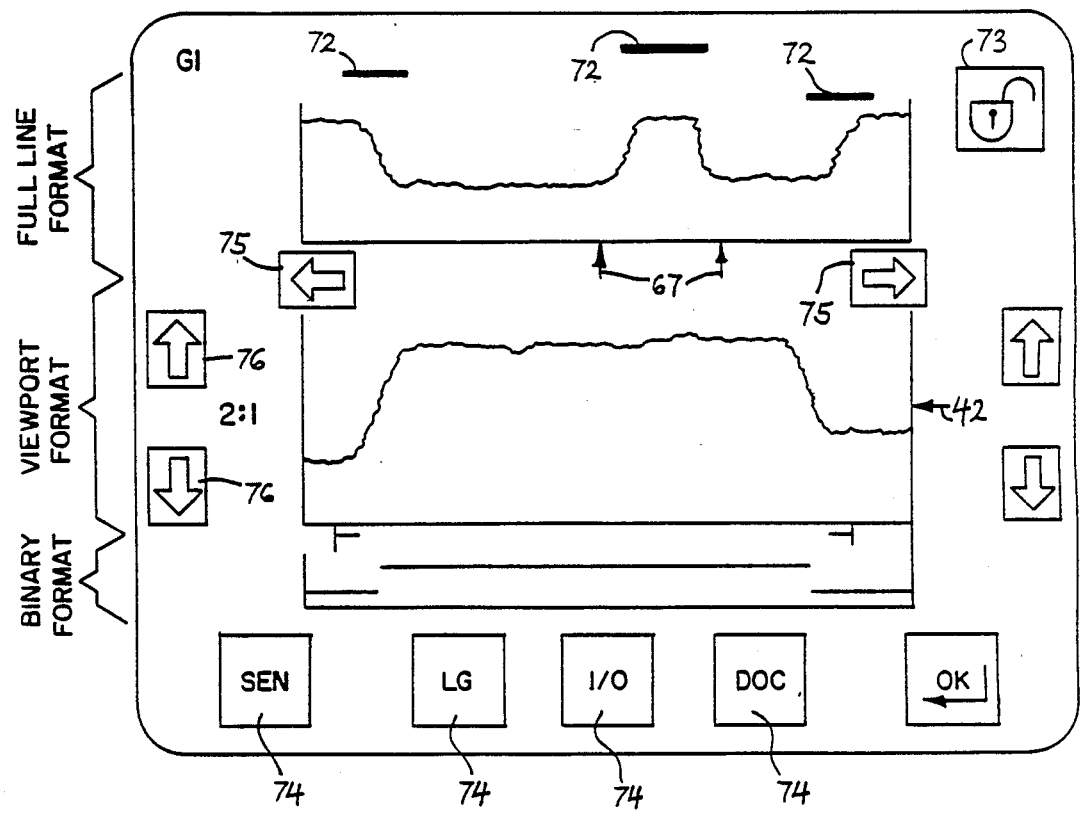
FIG. 3 is an illustration of an exemplary display on the monitor for the image processor.

One of the microcomputer processing functions is the generation of binary video image data to produce a monitor display similar to that shown in FIG. 3. The image element luminance data from the image sensor 40 is displayed on the monitor screen in three different two dimensional graphical formats in which the horizontal axis of each format represents image element locations along the linear image and the vertical axis represents each image element's luminance level. Each format depicts the luminance value for 200 of the 2,048 linear image elements. The first format 64 near the top of the display is a compressed version of the full image line. The horizontal axis is compressed by displaying only every tenth image element of the 2,048 image element line. The vertical axis displays a one-half compression of each image element's luminance level. Two upward pointing vertical arrows 67 beneath the full line format define a viewport along the display line.

The viewport, consisting of the segment of the full line format between the two vertical arrows, is displayed on the middle format 65 of the monitor display.

The width of the full line format segment can be changed to vary the viewport format "magnification" of the entire image format 64. For 1:1 magnification power, the viewport arrows 67 define an image segment having 200 image elements and every one of these image elements is represented in the viewport format 65. For the 2:1 magnification power, a 400 image element segment is defined with every other image element of the segment being depicted in the viewport format. Similarly, the 4:1 and 8:1 magnification powers have segments with 800 and 1600 image elements and display every fourth and eighth image element respectively in the viewport format 65. As the magnification increases the width of the viewport decreases. As will be described subsequently, the user may move the viewport anywhere along the image line to magnify that portion of the line.

The third display format 66 is a binarized version of the image elements displayed within the viewport format 65. The magnitude of each image element depicted in the viewport format 65 is compared to one of several user definable thresholds to create a binary format 66. A horizontal arrow on the right edge of the viewport format 65 along with a numerical value from zero to sixty-three (e.g. 42) indicate the grey scale luminance level used as the binarization threshold. In the binary viewport format 66, image elements having a luminance level greater than or equal to the binarization threshold will appear as a high binary value, whereas those image elements in the viewport image having a luminance level below the threshold will have a low value in the binary format 66. As will be described hereinafter, the video image also displays different function icons which are selected by the light pen 24 to control the image processor 20.

Figure 4:
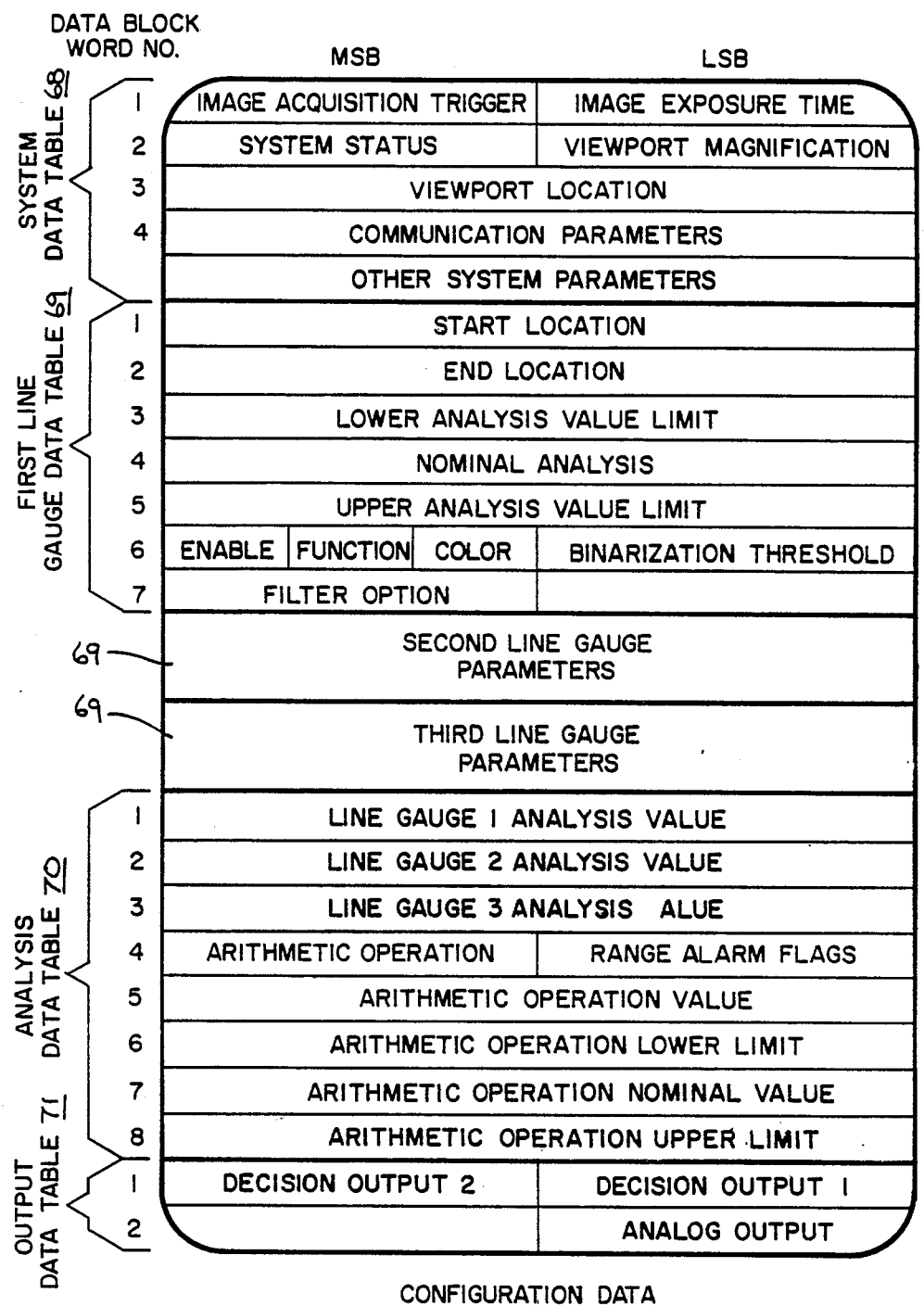
FIG. 4 depicts the data structure of the section of the image processor memory that stores the configuration parameters and the image analysis results.

The definition of the viewport location and magnification power and other processor configuration parameter data are stored in a group of data tables within the RAM 35. As illustrated in FIG. 4, each table is a series of sixteen bit words. The first of these tables 68 retains general system parameters defining various operations and designating user selected options to be implemented by the image processor 20. The least significant byte (LSB) of the system data table's first word defines the image exposure time during which the sensor 40 is acquiring charge in response to the intensity of the light focused on it. The image exposure time can vary from two to thirty milliseconds, as chosen by the user. Information stored in the most significant byte (MSB) of the first word in the system data table 68 specifies the source of the signal which triggers the acquisition of a new image. The trigger signal may come from an external signal applied to microcomputer input line 63 or from a command received via the serial port from programmable controller 10. In addition, a timer of the microcomputer 30 can generate the trigger signal, in which case the first word also specifies the timer interval. The second and third words contain the viewport location, i.e. the number of the leftmost image element in the viewport, and magnification power. The system data table 68 also contains communication parameters for the serial port.

With continuing reference to FIGS. 3 and 4, the evaluation of a sensor image as accomplished by the user defining up to three separate line gauges along portions of the linear image. The position and size of each line gauge is shown in the display above the top image format as three horizontal lines 72. In the course of defining each line gauge, the user also configures each one to perform a specific evaluation function on the corresponding image elements. The configuration parameters for each of the line gauges is stored in separate data tables 69 within RAM 35. The format for the first line gauge data table 69 is illustrated in FIG. 4. The first word contains the number of the image element location along the line at which the line gauge starts and the second word contains the end location of the line gauge. As noted previously, the resultant value of the image analysis function is compared to upper and lower value limits to determine whether or not the resultant value is within this defined range. These analysis value limits are stored in the third and fifth words of the line gauge data table. For certain operations, a nominal analysis value is stored in the fourth word. The least significant byte of the sixth data table word of the line gauge data table 69 contains the threshold for binarizing the image element grey scale luminance levels. A different binarization threshold can be defined for each line gauge.

The individual bits of the most significant byte of the sixth word defines three different parameters. One bit indicates whether the line gauge is enabled or disabled, and another bit selects whether white or black binary image elements will be evaluated. The six remaining bits define the particular evaluation function to be performed on the binary version of the linear image. The following table contains a list of exemplary analysis functions:

Count number of image elements
Count number of edges
Count number of blobs
Find width of largest blob
Find center of largest blob
Find right edge of rightmost blob
Find left edge of leftmost blob A blob is a group of contiguous image elements of the same color preceded and followed by a image element of the other color. An edge is a transition from either a white image element to a black image element or a transition from a black image element to a white image element. Since the line gauges are implemented in software, additional functions can be provided by incorporating the necessary software routines into the operation program for the image processor. The number of bits designated in the parameter table to define the functions permits a large number of operations to be defined.

The most significant byte of the seventh parameter word defines an image filter function which is to be applied in processing the image. One bit of this byte enables the filter option and other bits define the minimum number of image elements which can be considered a blob. The filter function is employed to mask out small blobs which are likely to be image artifacts of noise. For example, a blob would not be counted unless it is at least two image elements wide.

Another data table 70 consisting of eight words stores the analysis values from each evaluation performed by the processor. The first, second, and third data table words contain the resultant value from performing the analysis function for each of the three line gauges respectively. The bits of the least significant byte of the fourth word form range alarm flags designating whether of each analysis value is within the range defined by the prescribed upper and lower value limits.

An arithmetic operation can also be performed on the analysis values of two line gauges. For example, one line gauge analysis value can be subtracted from the other to obtain the difference. The operation and the line gauges used are defined by the most significant byte of the fourth word in the analysis data table 70. The product of the arithmetic operation is stored in the fifth word and is treated as another analysis value. In this regard, the remaining analysis data table words contain the lower analysis value limit, nominal analysis value and the upper analysis value limit for the product of the arithmetic operation. The comparison of the arithmetic operation analysis value to these limits determines the state of one of the range alarm flags.

As noted above, the image processor 20 generates three outputs which indicate the results of different evaluations performed on the image. Each line gauge can be assigned to one or more of these outputs. The line gauge assignment and parameters for determining the state of each of the three processor outputs are stored in an output data table 71 within RAM 35, as illustrated at the bottom of FIG. 4. Each byte of the first output data table word defines which of the line gauges determines the state of the two binary output decision bits. Multiple line gauges may be assigned to each of the decision outputs with the resultant state being determined by a logical AND of the selected line gauge range alarm flags. The second output parameter word specifies the line gauge analysis value which is to be used as the source of the analog output.

With this functional overview in mind, the details of the image processor operation, under the control of the microcomputer 30, can be delved into.

Image Processor Operation

The image acquisition and interpretation functions, described in the preceding section, are performed in response to the execution of a control program by the microcomputer 30. FIGS. 5-10C are flow charts of principle routines within this control program.

Figure 5:
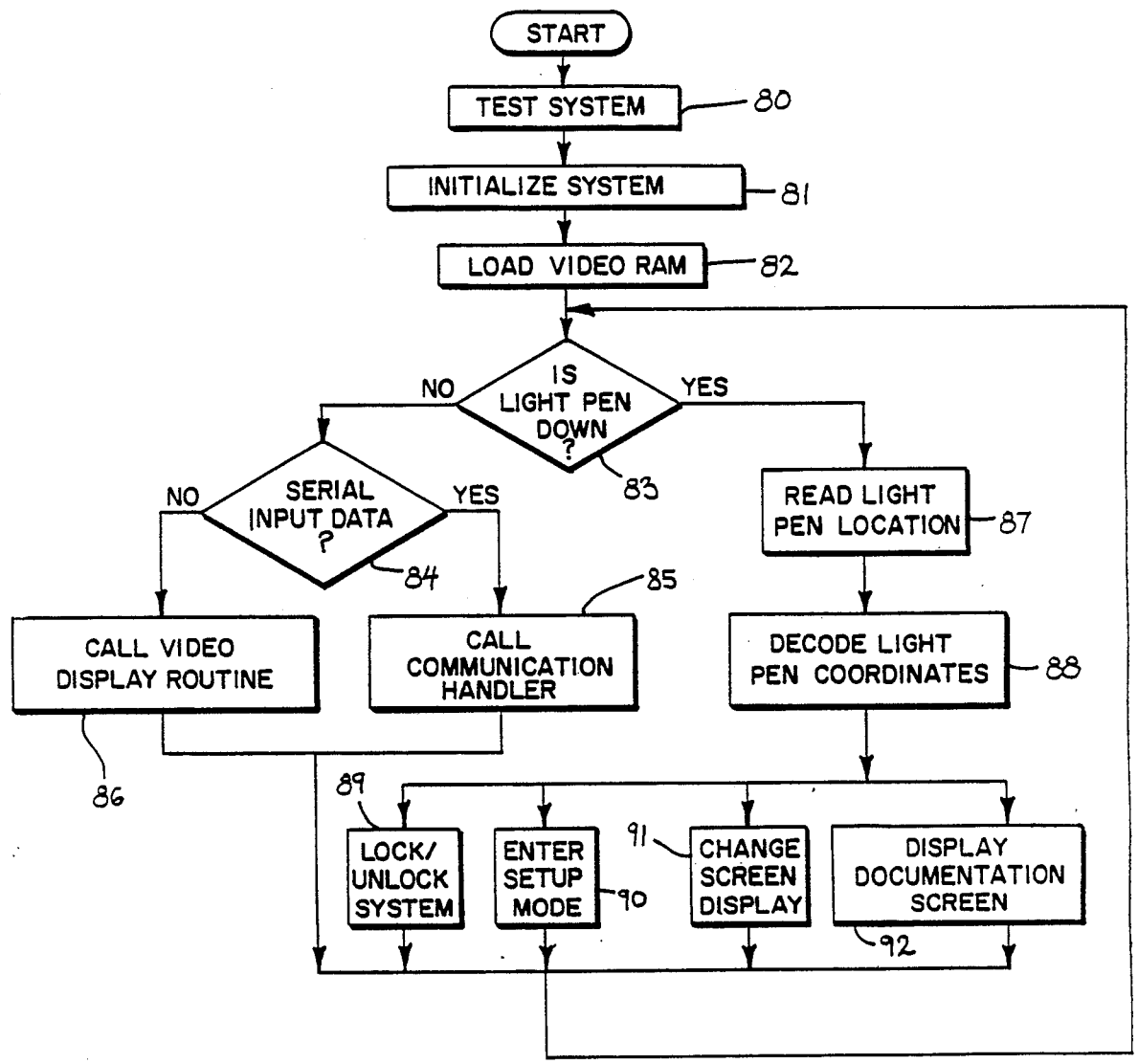
FIG. 5 is flowchart of the processor operation program's main control loop.
Figure 6:
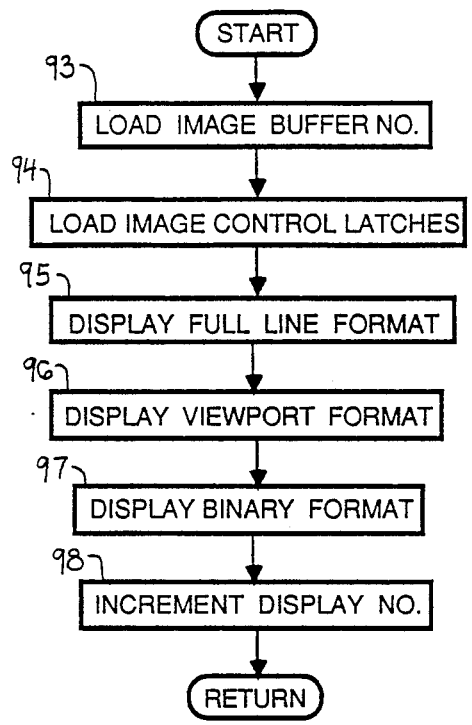
FIG. 6 is a flowchart of the basic steps of the video image display routine called from a step in FIG. 5.
Figure 7:
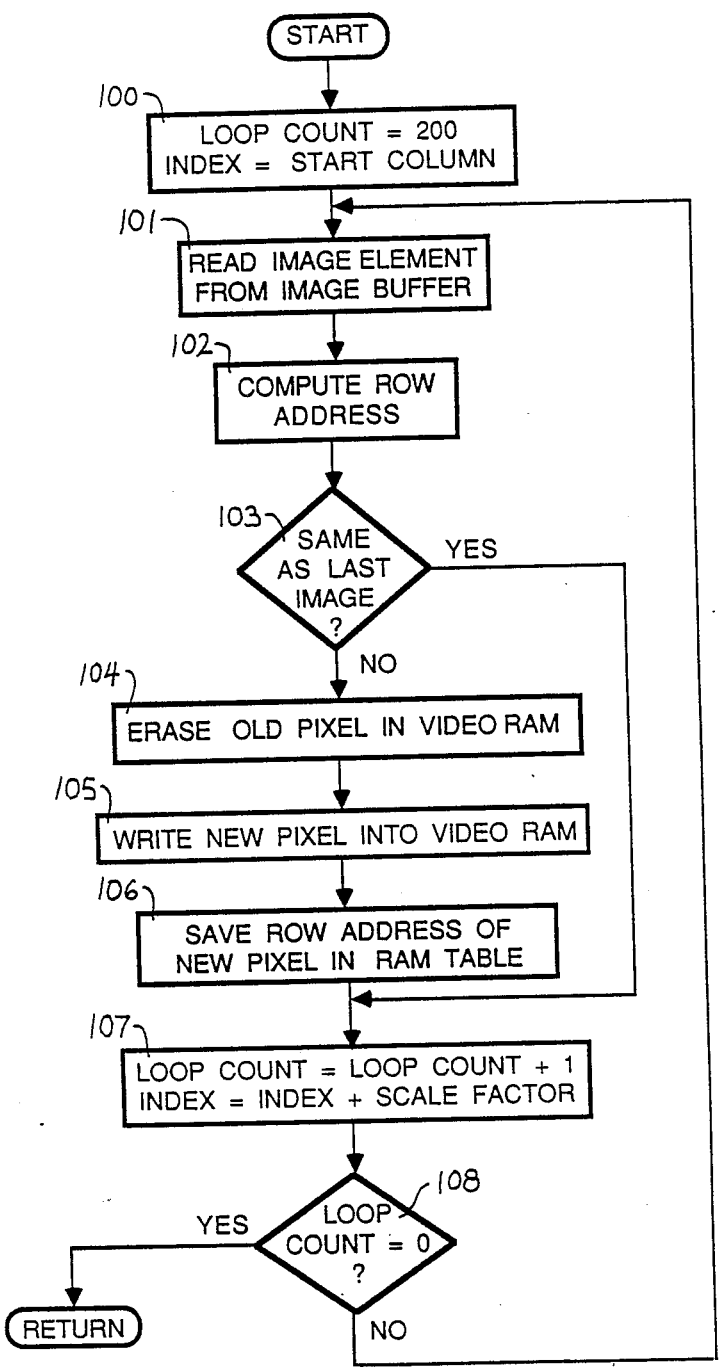
FIG. 7 represents the flowchart of a generic routine to display each format section of the video image.

When the image processor 20 is powered up, the control program commences with step 80 at the top of FIG. 5. At this point, the microcomputer 30 carries out an internal diagnostic test of itself and the other components within the image processor 20 to insure that they are in proper operating condition. The microcomputer then initializes the image processor by placing the various latches, timers, and counters into their beginning states and sets the variables used the course of the program to their initial values. At step 82, data for the background portions of the video display are stored within the video RAM 54. This display is similar to that shown in FIG. 3, except that since an image has yet to be acquired, the graphical representations of the image elements in each of the three display formats 64-66 is not present. In creating the background portions of the video display, the microcomputer 30 stores pixel data in the video RAM 54 which "draw" the vertical and horizontal lines for each of the format areas and copies bit mapped icon images from ROM 34.

The microprocessor, at step 83, then tests the bit received on line 62 from the light pen latch 61 to determine whether the tip of the light pen has been pressed against the screen of monitor 22. If the light pen is not active, the program branches to decision block 84 where the serial interface within the microcomputer 30 is examined to determine whether serial input data has been received. If such data is found, the microcomputer executes a conventional communication handler task at step 85. This task processes the incoming serial data and stores it within a designated area of RAM 35. Any responses to the incoming data are also sent.

If at step 84 new serial input data is not found, the program execution advances to step 86 where a video display routine is called. This routine, illustrated in FIG. 6, acquires data from the image RAM 45 which is then processed to create the image element format displays. As noted previously, the image RAM 45 contains four separate buffers, each of which can contain a different image. In one mode of operation, when the evaluation of a sensor image fails a test, that image is held in one buffer and repeatedly displayed on the monitor 22, while new sensor images are being stored in another buffer. The routine commences at step 93 by the microcomputer 30 obtaining the number of the active buffer for display purposes. The microcomputer 30 then insures that the DONE signal indicates that the image section 31 is not acquiring an image and that the first bus isolation circuit 50 is coupling the buses 27-28 of the microcomputer section 32 to the corresponding buses 26'-28' of the image section 31. When the image section 31 is available, four control bits are stored in the set of control latches 47 of the image section 31. The image buffer number is stored in two of the control latches 47 that provide the buffer select bits to the most significant address lines of the image RAM 45. A bit is stored in another one of the control latches 47 to provide an inactive enable signal (EN) to the image storage controller 46. An inactive acquire signal also is produced by loading a bit in a corresponding control latch.

The display of the graphical image element information for each of the three formats 64, 65 and 66 of the video display (FIG. 3) is generated by a display routine called at steps 95, 96, and 97, respectively. Each of these steps calls the display subroutine shown in FIG. 7 and passes data which configures the subroutine to transform image RAM data into video RAM data to create the corresponding display format. When the display subroutine commences at step 100, a loop count is initialized to 200, the number of image element display locations along the horizontal axis of each display format. Also at this time, an index variable is initialized to the number for the first image element to be displayed. In the case of the full line format 64, this is the first image element stored in the image RAM 45, whereas for the viewport and binary formats 65 and 66, it is the first image element of the viewport as defined by the two vertical arrows 67 beneath the full line format 64 in FIG. 3. The image element number value for these latter two formats is stored as the viewport location in the third word of the system parameter data table 68 in RAM 35 (see FIG. 4). The microcomputer 30 then adds the index value to the base address of the image RAM 45 to produce the address of the desired image element at step 101. Once the address for the image element has been computed, the microcomputer sends it over the address bus 27 and 27' to the image RAM 45 which in response applies a digital number from zero to sixty three onto the data bus 26 and 26' representing the grey scale luminance level for that image element.

The microcomputer 30 uses the grey scale luminance of each image element to plot that image element's position in the selected format area of the monitor's display screen. Each format is a graph with the horizontal axis representing the position of each image element along the linear sensor image and the vertical axis represents each image element's grey scale luminance level.

For example, the height of the viewport format 65 in the center of the screen is sixty four video scan rows. Therefore, each row corresponds to one of the sixty four grey scale luminance levels. In determining the position on the screen at which to display a given image element, the microcomputer increments the video RAM column address to the next horizontal position along the format. At step 102, the microcomputer 30 then computes the vertical axis coordinate, which in the case of the viewport format 65, is computed by subtracting the grey scale luminance level stored in the image RAM 45 from the address of the video row at the bottom of the viewport format. The resultant row and column addresses provide the address of the storage location within the video RAM 54 which corresponds to the location on the display for this image element. A high logic level bit is stored at this location of the video RAM 54.

The computation of the vertical axis coordinate for the full line format 64 at the top of the display is similar to that of the viewport format 65 except the full line format is only thirty-two video rows high. Therefore, the gray scale luminance level from the image RAM 45 must be divided by two to derive the number of scan rows above the format's bottom row at which to plot the image element.

The computation of the vertical axis coordinate for the binary format 66 is a little more complex since it displays a binarized version of the linear image. As noted previously, each of the three line gauges has a separate binarization threshold defined within its data table 69. One of these line gauges and its corresponding binarization threshold are selected by the user to create the binary format on the display. The selected line gauge has its number displayed in the upper left corner of the screen, which in the case of the exemplary display of FIG. 3 indicates that the first line gauge (G1) has been selected. In creating the binary format, the microcomputer 30 compares the digital grey scale luminance level for each image element to the binarization threshold of the selected line gauge. If the grey scale luminance is equal to or greater than the threshold, the image element is represented by a high logic level; whereas if the grey scale luminance is below the threshold, the image element is represented by a low logic level on the binary format 66. Once the high or low logic level for the current image element has been derived, its vertical axis coordinate can be computed. Each image element is represented by a position at one of two distances above the bottom row of the binary format 66. For example, if the binary representation of the image element is a low logic level, its vertical coordinate is three rows above the bottom row and if the binary image element is represented as a high logic level, its vertical axis coordinate is nine rows above the bottom row of the binary format display.

The newly computed row address, representing the luminance level of the image element, then is compared at step 103 to the row address in the currently displayed video image where that image element's luminance level is currently plotted. The row addresses of the current display for each format are stored in tables in RAM 35. If the two row addresses are the same, indicating that the luminance level for this image element has not changed, the display for this image element location does not have to be updated. As a result, the program execution jumps to step 107. However, if the two row addresses are different, a new luminance level must be plotted for this image element. In doing so, the video pixel representing the old luminance level is erased by storing a low level (black) pixel bit in its location in video RAM 54 using the column address and the old row address at step 104. Next, the column address and the newly computed row address for the latest luminance level of this image element are used by the microcomputer to store a high logic level (white) pixel bit in video RAM 54 at step 105. This latter step plots a bright spot on the display format at a location which corresponds to the image element's luminance level. The row address of the new image element luminance level also is stored in the table for this format within RAM 35 at step 106 for later evaluation at step 103 when the luminance of this image element is processed again.

The program then advances to step 107 where the microprocessor 30 increments the loop count. In addition, the index variable is changed by adding to it a scale factor for the particular format which is being displayed. Since the index variable is employed to access the image elements in the image RAM 45, the scale factor determines the address step for the next image element. For example, in the full line format, every tenth image element of the image is displayed so that in this format the scale factor is ten. The scale factor used in the viewport and binary format images is determined by the selected magnification for the viewport. When a one-to-one magnification is selected, the scale factor is one indicating that every image element within the defined viewport segment of the linear image will be displayed. The scale factor is two for the two-to-one magnification factor indicating that every other image element within the defined viewport segment will be displayed. Corresponding scale factors exist for the remaining magnification powers.

Then, the new loop count is examined at step 108 to determine whether is has reached zero indicating that all of the image elements have been displayed for this format. If so, the program execution returns to the step 95, 96, or 97 of FIG. 6 from which it was called. Otherwise the format display routine returns to step 101 for processing the next image element from the image RAM 45.

Once each of the three display formats has been updated, a display number counter within RAM 35 is incremented at step 98. As noted previously, the updating of the video display occurs whenever other tasks such as handling serial communications or light pen input are not active. Therefore, the display number count can be interrogated by the microcomputer to determine whether the display has been updated since a previous interrogation. Once the display count has been incremented, the video display routine terminates and the execution returns from step 86 to step 83 of FIG. 5, to repeat the main program loop.

Once the light pen 24 is found to be active, the program advances to step 87 where the microcomputer 30 sequentially reads the contents of the light pen location latches 60 to determine the video RAM row and column addresses which correspond to the light pen's position on the monitor screen. The row and column addresses are decoded at step 88 to determine which of the several icons displayed on the screen have been selected by the user. In doing so, the microcomputer compares the row and column addresses to ranges of such addresses for each of the icon areas. Once the type of icon to which the light pen is pointing has been determined, the program advances to one of the step branches 89, 90, 91 or 92 which calls a software routine for that type of icon. Theses branches allow the user to alter the display and configure the image acquisition and analysis parameters. If the light pen is active, but not pointing to one of these icons, the execution continuously loops back to step 83 until the light pen is deactivated or an icon is selected.

The program branches to step 89 whenever the user selects the padlock icon 73 in the upper right corner of the video display illustrated in FIG. 3. This icon 73 is used to lock and unlock the user's access to the system. In the unlocked state, images may be acquired by the sensor 40, but are not analyzed. The image processor outputs are inactive in the unlocked state. In order for the user to alter the configuration parameters that define image acquisition and evaluation functions, the processor must be unlocked. The images acquired in this state are displayed on the monitor 22 in order for the user to visualize the effects that each parameter change has on the image processing. When the processor is in the locked state, each image is analyzed and the results of the processing determine the state of the processor outputs. The locked/unlocked state is indicated by a flag stored in the RAM 35.

If one of the icons 74 is selected, the program execution branches to step 90 and enters set up mode, in which the various system, line gauge and analysis parameters can be changed. In this step, the specific icon is determined and a subroutine for configuring the various selected class of parameters is called. These subroutines are similar to those described with respect to the configuration of line gauges in the aforementioned U.S. patent application. Therefore, the details of the set up mode will not be elaborated upon herein.

As noted with reference to FIG. 3, the display screen contains various arrow icons which allow different screen functions to be changed. For example, the left and right word pointing arrows 75 in the boxes beneath the full line format can be selected by the light pen 24 to move the viewport, defined by the upward pointing arrows 67, to the right or to the left. Similarly, the vertical pointing arrows 76 at the left side of the screen can be employed to change the magnification power of the viewport format. When one of these icon areas has been selected, the light pen location coordinates are decoded to advance the program to step 91 on FIG. 5 where the change screen display routine is called.

Figure 8:
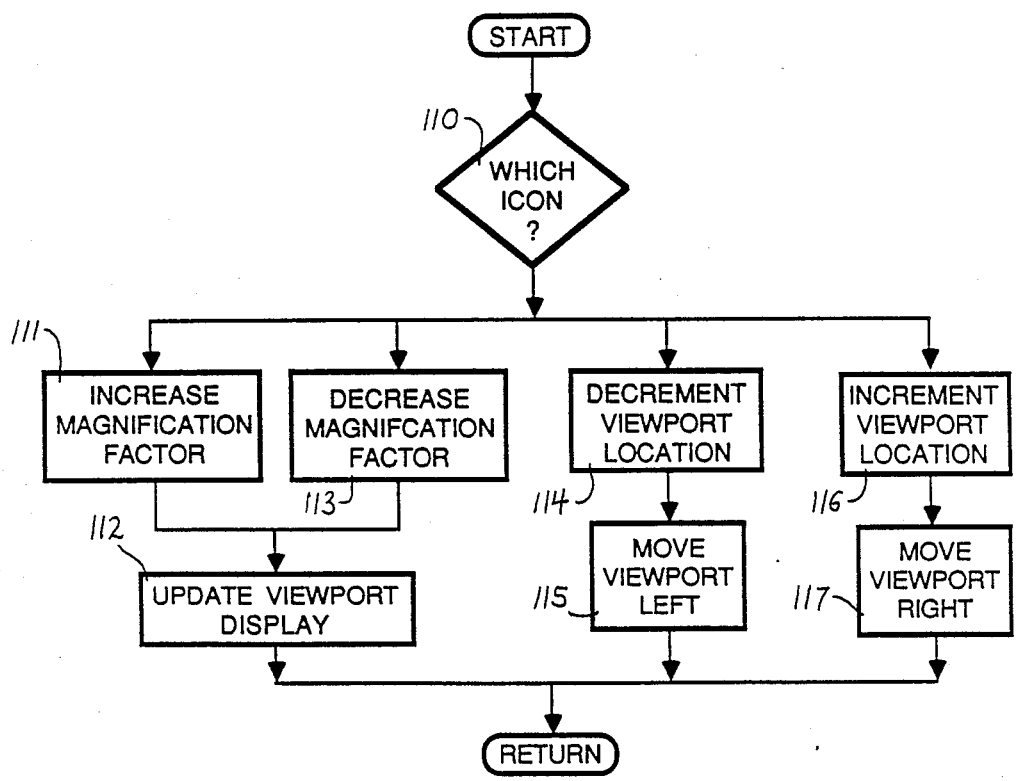
FIG. 8 depicts the flowchart steps of the change display screen routine called by a step in FIG. 5.
Figure 9:
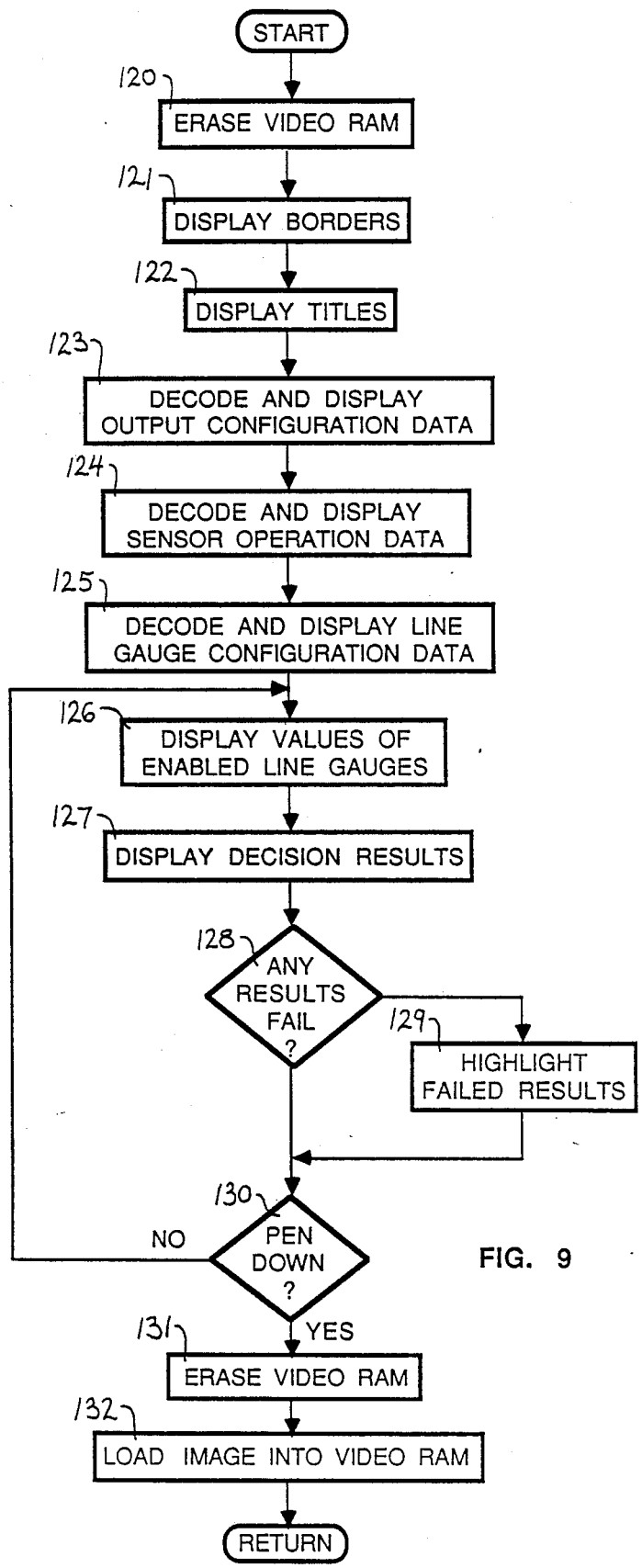
FIG. 9 illustrates the flowchart of the routine which displays the documentation screen on the processor monitor.

The change screen display routine is depicted by the flowchart of FIG. 8 which commences at step 110 where the row and column addresses read from the light pen location latches 60 are further interpreted to determine which one of the four arrows 75 or 76 has been selected by the light pen 24. Specifically, if one of the arrows 76 at the left side of the screen has been selected, the viewport magnification power is increased or decreased according to the direction of the selected arrow. The magnification power is selected from a 1:1, 2:1, 4:1 and 8:1 magnification of the viewport. As previously described, the magnification power determines the width of the viewport with respect to the full line format 64 at the top of the video display. If the upward pointing magnification control arrow 76 is selected by the light pen, the program advances to step 111 where the viewport magnification is increased to the next higher power which is then stored in the least significant byte of the second word in the system data table 68 of RAM 35 depicted in FIG. 4. The video display is then changed at step 112 by the microcomputer 30 erasing the right vertical arrow 67 beneath the full line format 64 and redrawing it farther to the right at a new point which corresponds to the width of the viewport defined by the new magnification power. At the same time, the microcomputer 30 changes the numerical designation of the magnification power at the left side of the viewport format 65 on the display. Both of these screen display update operations involve changing corresponding pixel storage locations in the video RAM 54 to produce the designation number or arrow image. If the lower magnification control arrow 76 has been selected by the light pen, the program advances instead to step 113 on FIG. 8 where the magnification power is decreased and the program advances to step 112 where the screen is updated by narrowing the viewport to correspond to the new magnification.

If either of the horizontal arrows 75 beneath the full line format 64 is selected, the viewport is moved in the corresponding direction pointed to by the arrow. For example, if the left pointing arrow is selected, the routine of FIG. 8 advances to step 114 where the viewport location word within the system data table 68 is decremented by twenty and the new location is then employed at step 115 to redraw the viewport designation vertical arrows 67 beneath the full line format 64 at one display column to the left. Similarly, if the right pointing viewport control arrow is selected by the light pen 24, the program advances to step 116 where the viewport location word is incremented by twenty and the designation arrows 67 moved one display column to the right.

It should be noted that changing the magnification power or the viewport location does not produce an alteration of the graphical plot of the image element gray scale luminance levels until the next refresh of the video RAM 54 by display data from the image RAM 45 at step 85 on FIG. 5. However, as the display routine is executed whenever the light pen or the communication handler task are not consuming the microcomputer's processing time, the alteration of the magnification or the viewpoint location appear to the user as producing an immediate change on the display of the linear image elements. After each icon selection is processed by a branch of the routine in FIG. 8, the program execution returns to step 83 on FIG. 5.

In addition to providing a graphical representation of the line scan image as shown in FIG. 3, by selecting the documentation (DOC) icon 77, the program execution advances to step 92 on FIG. 5. In response to this selection, the configuration parameters and image analysis results are displayed on the screen of monitor 22 in numeric tabular form. This allows the user not only to review all of the configuration parameters, but also to observe the numerical analysis results change as each image is acquired. When the documentation display format is selected, step 92 calls the subroutine depicted by the flow chart of FIG. 9. This routine commences at step 120 with the microcomputer 30 accessing the video RAM 54 to erase its contents by storing a low logic level in each of the storage locations. Alternatively, this erasure can be carried out by the video control circuit 55. Once this has been accomplished, the microcomputer uses data retained in the system ROM 34 to store image pixel bits in the video RAM 54, thereby drawing the borders and outlines of the documentation display video image at step 121. Next, at step 122, the titles of each of the parameter and evaluation result entries of the table are displayed using data from ROM 34. Then, sequentially at steps 123, 124, and 125, the microcomputer 30 reads the data from each of the data tables 68 and 69 in RAM 35 which contain the configuration data for the sensor operation and line gauges, respectively. In doing so, the microcomputer converts the binary numbers and flag bits from the data tables into alphanumeric characters indicative of each configuration parameter or analysis result. These characters are displayed on the monitor 22 by storing their bit mapped images in the proper locations of the video RAM 54.

The program advances to step 126 where the analysis data table 70 within RAM 35 is read to find the current evaluation values for the arithmetic operation and for each line gauge. These values are converted into alphanumeric form and stored as bit mapped characters in the video RAM 54 for display. A similar display of the output evaluation decision results is carried out at step 127. The microcomputer 30 then examines the range alarm flags within the fourth word of the analysis data table 70 to determine whether any of the evaluation results have failed, that is the line gauge or difference analysis value is outside of the predefined upper and lower limits. If such a failure is found at step 128, the program branches to step 129 where the failed results are highlighted on the display screen making them more readily observable to the user.

At step 130, the microcomputer 30 examines the state of the light pen latch 81 to determine if the pen is being pressed against the monitor screen which indicates that the user no longer desires that the documentation format be displayed. If the light pen is not active, the program returns to step 126 where the line gauge values and evaluation results are again read and used to update the display. By looping repeatedly through steps 126–130, data from the analysis of a new image will be displayed. When the light pen is found to be active at step 130, the program advances to step 131 where the microcomputer erases the video RAM 54 and then stores the background portions for the primary display illustrated in FIG. 3 at step 132 before returning to the main program loop depicted in FIG. 5. At step 132, the program does not display the image element graphical information on the monitor, rather this information is displayed upon the next execution of the video display routine at step 85 of the main flow chart of FIG. 5.

Thus, the microcomputer 30 continuously executes the program loop illustrated in FIG. 5 to either refresh the video RAM with new image display information, handle the transmission and reception of serial data via the serial port of the processor, or respond to inputs by the user via the light pen 24. This program loop does not control the acquisition of new images by the sensor 40, which image acquisition is initiated by a trigger signal that interrupts the normal execution of this loop by the microcomputer causing it to execute an interrupt routine for the image acquisition.

Figure 10A:
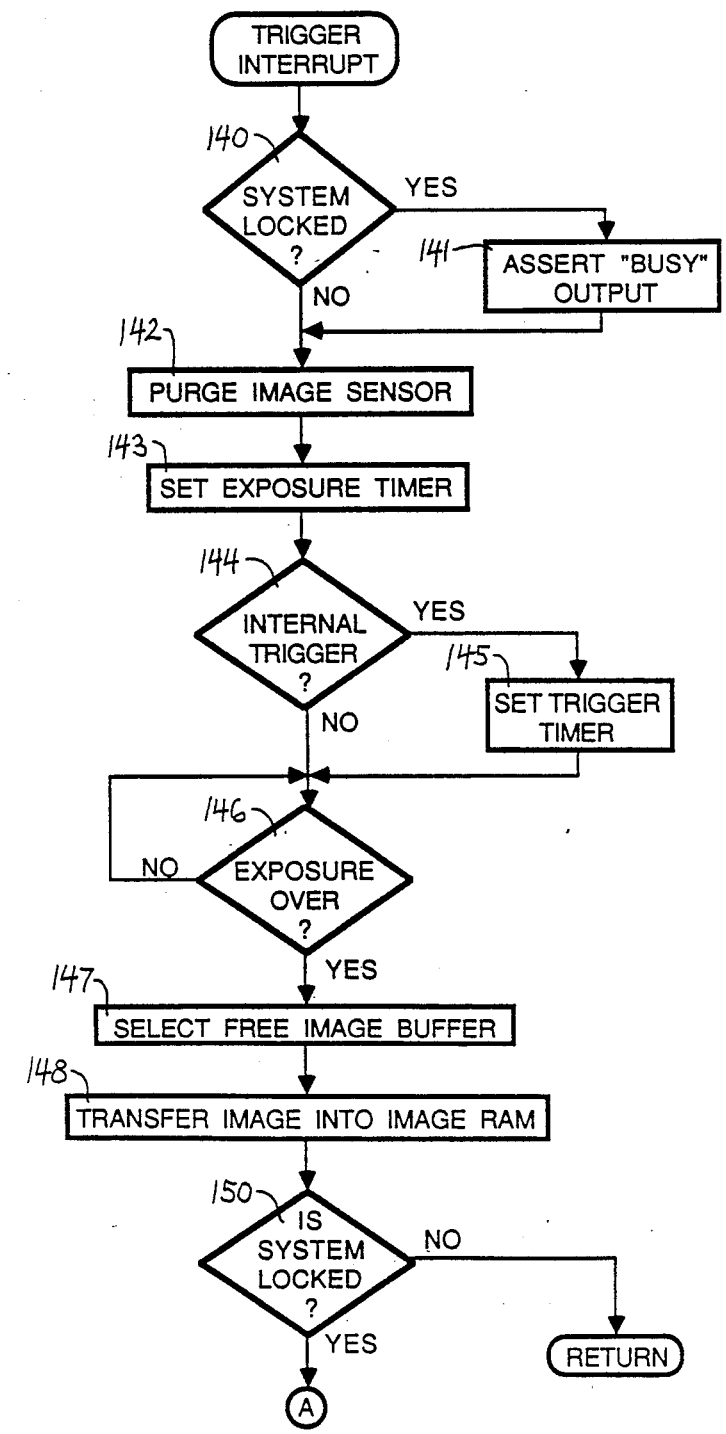
FIGS. 10A–10C are a flowchart of the image acquisition and analysis interrupt routine.
Figure 10B:
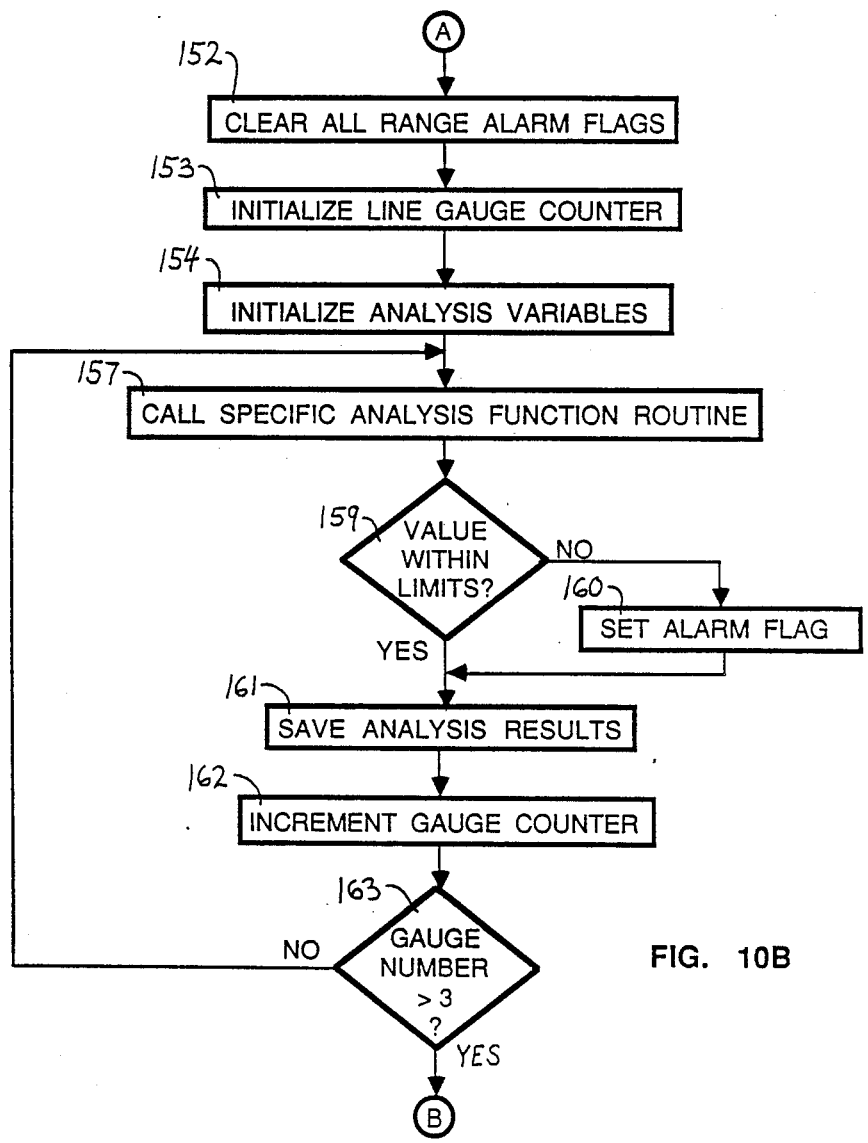
Figure 10C:
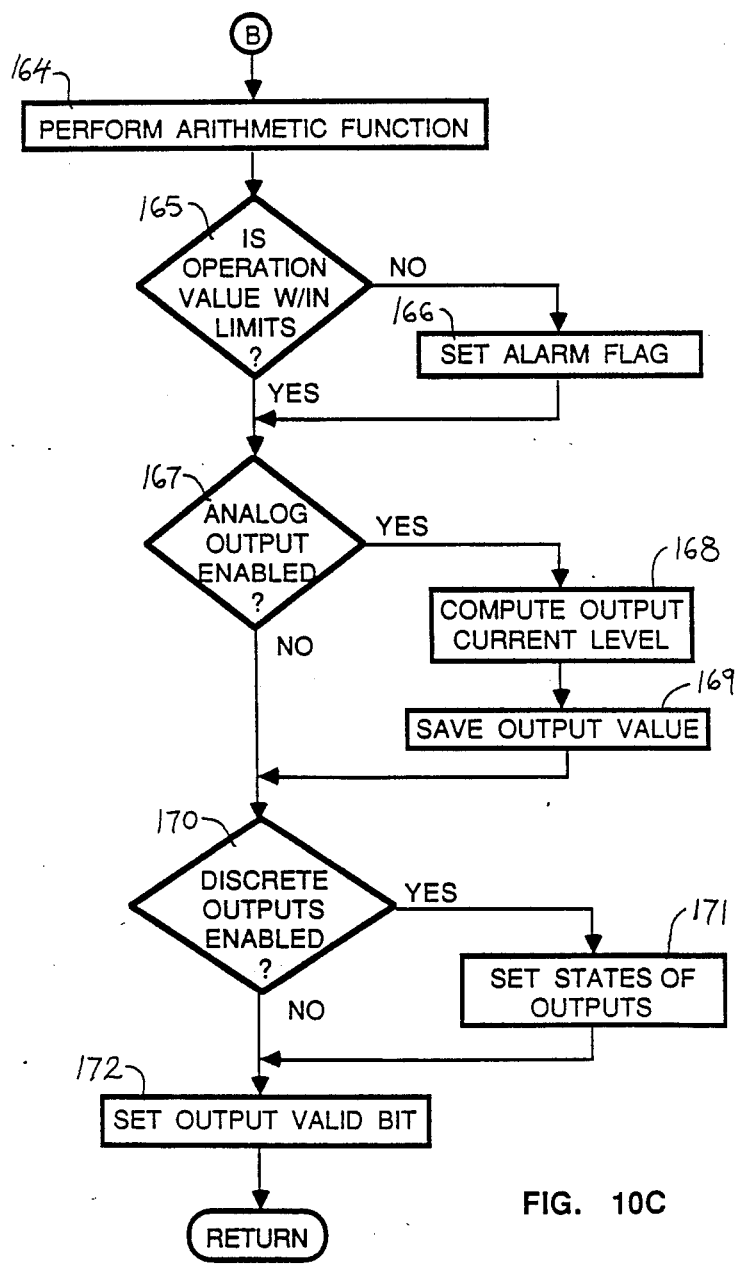

FIGS. 10A–10C contain a flow chart of the image acquisition interrupt routine. This routine is initiated by one of three types of trigger signals. The first is an interrupt signal generated by an internal timer within the microcomputer 30. This timer is loaded with the user defined image acquisition trigger interval stored in the system parameter data block of RAM 35 (see FIG. 4). A second trigger signal can be applied from an external source via line 63 to an interrupt input of the microcomputer 30. The third source for triggering the image acquisition is a command received by the processor 20 through the serial port. Unlike the first two trigger signals, which immediately interrupt the processing of the microcomputer 30, the serial port trigger command must be received and decoded by the communication handling task before the image acquisition routine is executed.

When a trigger signal is received, the microcomputer 30 determines at step 140 of FIG. 10A whether the system is unlocked. If the system is locked, a busy indication bit is stored in the corresponding output data latch 37 and an LED latch 36 to provide the respective output signal and LED illumination at step 141. Since light is continually being focused on the line scan sensor 40 causing it to accumulate charge at each of its imaging sites, prior to acquiring a new image, this accumulated charge must be purged from the sensor 40. To do this, the microcomputer 30 gains access to the image section 31 through the first bus isolation circuit 50 and stores control bits in the set of control latches 47 which disable the image storage controller 46 and provide an acquire signal to the sensor clock 42. In response to the active acquire signal, the sensor clock 42 clocks the sensor 40 to purge its accumulated charges at step 142. However, since the image storage controller 46 is disabled, the image A/D converter 44 does not have its output enabled so that the sensor output is not coupled to the image RAM 45. In addition, the image storage controller 46 is not producing write enable and address signals for the image RAM 45 at this time. After the sensor charges have been purged, the exposure timer within the microcomputer 30 is loaded with the image exposure time stored in the system parameter data table of RAM 35 at step 143. If the internal trigger is enabled, as determined at step 144, the trigger timer within the microcomputer 30 is set to its initial value to begin timing the interval to the next trigger signal at step 145. The microcomputer 30 then monitors the exposure timer at step 146 waiting for it to time out at the point where the desired amount charge has been accumulated in the line scan sensor 40.

Once the exposure time has elapsed, the microcomputer determines which of the buffers within the image RAM 45 is available for storing the new image and the two bit designation of that buffer is then stored within the respective control latches 47 in the image section 31 at step 147. At the same time, additional bits are loaded into the other control latches 47 at step 148 to enable the image storage controller 46 and send an active acquire signal to the sensor clock 42. In response to the enable and acquire signals, the image storage controller applies an active output enable signal to the image A/D converter 44 and an active signal to the write input of the image RAM 45. At the same time, the image storage controller 46 causes its address output to go from the tri-state mode to the active mode thereby applying an address signal to the image RAM 45. In this state, the DONE signal is inactive causing the first bus isolation circuit 50 to disconnect the buses 26' and 28' within the image section 31 from the associated buses 26 and 28 within the microcomputer section 32. Therefore, during the image transfer cycle, the microcomputer 30 is inhibited from accessing the image RAM 45 which is now under the control of the image storage controller 46.

Each of the image element data within the sensor 40 is then sequentially clocked over line 41 into the A/D converter 44 which produces a sixty four level gray scale digital representation of each image element's luminance. As each image element data appears at the output of the A/D converter 44, the image RAM 45 is clocked to store that data in a different storage location within the selected image buffer. After all 2,048 image elements have been clocked from the sensor 40 and their grey scale luminance levels stored in the image RAM 45, the image storage controller 46 disables the A/D converter 44 and the further addressing of image RAM 45. At the same time, active DONE signal is sent to the bus isolation circuit 50 and to the microcomputer 30. The DONE signal informs the latter device that it may now access the data for the new image from the image RAM 45, and also causes the buses of the image and microcomputer sections 31 and 32 to be connected.

At step 150, the system lock flag within RAM 35 is inspected and if the system is found to be unlocked, the image acquisition and analysis interrupt routine terminates returning the program execution to the main program loop. However, if the system is found to be locked, the program advances to step 152 on FIG. 10B to analyze the newly acquired image using each of the enabled line gauges. At this juncture, all of the range alarm flags within the results data block are cleared at step 152 and a line gauge counter is initialized to one at step 153.

The program execution then enters the line gauge inspection loop and the variables used during the inspection are initialized by the microcomputer at step 154. The inspection routine then advances to step 157 where the routine for the specific analysis function defined within the selected line gauge parameter block is executed. As noted previously, various counting and position determination functions based on either white or black image elements may be carried out on the portion of the image defined by the line gauge. These line gauge functions and their corresponding software routines are similar to those described in the aforementioned U.S patent application. Therefore, each of these routines will not be described herein.

Figure 11:
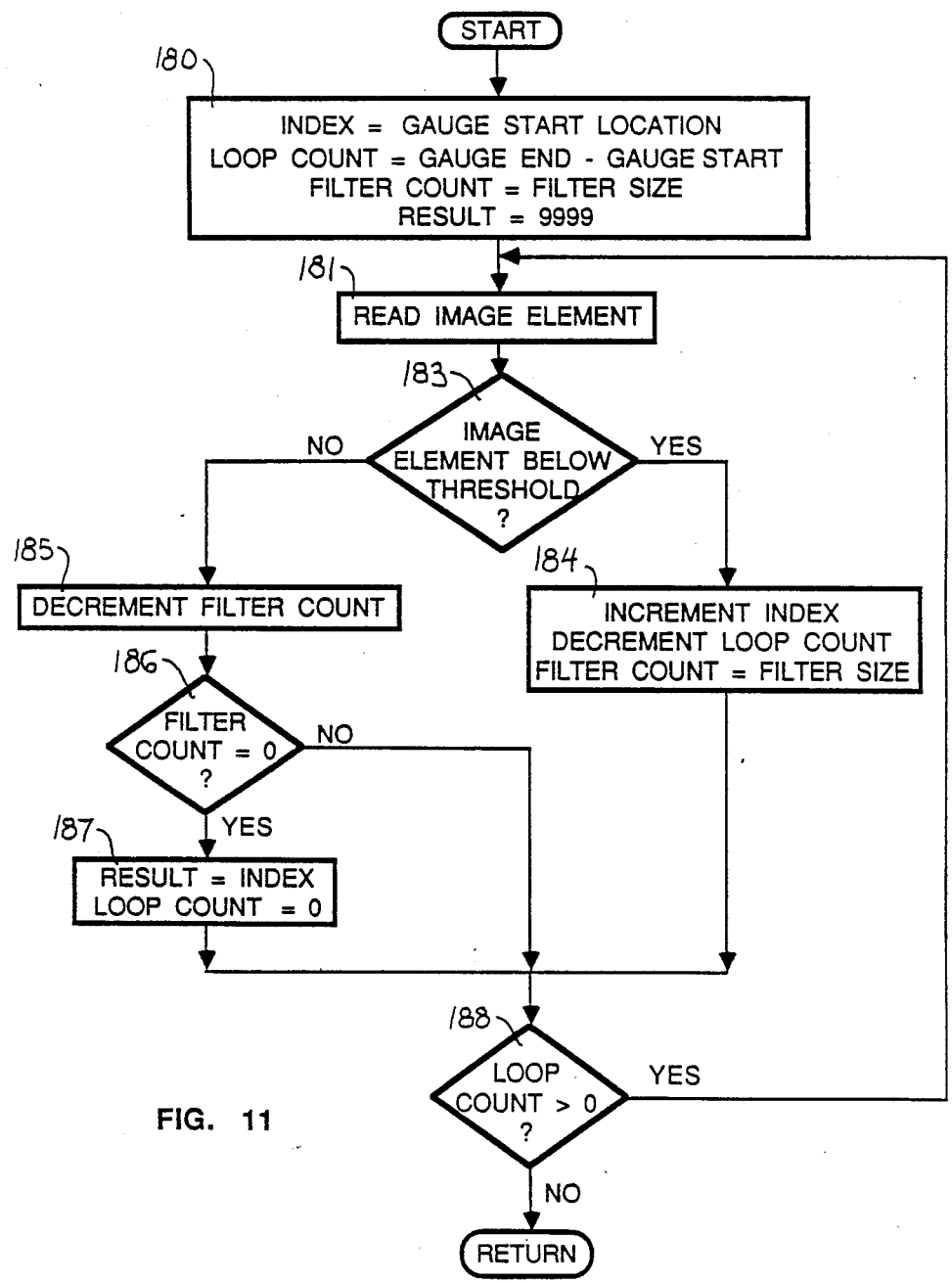
FIG. 11 is a flowchart of one of the image analysis function routines called by a step in FIG. 10B.

However, as an example, FIG. 11 is a flowchart of a routine for finding the left edge of the leftmost white blob. At step 180 the microcomputer 30 initializes the variables and counters used in the routine. An index variable which is used to point to the image elements for processing is loaded with the line gauge start location which is the number of the image element at the left edge of the selected line gauge. A loop count is loaded with the line gauge length determined by adding one to the difference between the start and end locations of the line gauge. A filter count variable is loaded with filter size contained in the filter option byte of the line gauge data table. The result variable is loaded with 9999, the value which indicates a failure to find a valid edge.

At step 181, the index value is added to the base address of the active buffer in image RAM 45 to derive the address of the first image element to process. This element's gray scale luminance level is then read from the image RAM by the microcomputer 30. Then at step 183, this luminance level is compared to the binarization threshold for the line gauge. If this is a "black" image element, its luminance level will be below the binarization threshold and the program branches to step 184. At this point, the index variable is incremented for the next image element and the loop count is decremented. The filter count is restored to the value of the filter size before the program advances to step 188.

If at step 183 a white image element was found, i.e. its luminance level was not below the threshold, the program execution branches to step 185. At this point, the filter count is decremented and the new count is checked at step 186 to determine if it equals zero. When the filter count equals zero, a blob having the minimum width selected by the user has been found. If a valid width blob is found, the program advances to step 187, where the result variable is set equal to the index value representing the number of the left image element in the leftmost blob. The loop count is then forced to zero. Otherwise, if the filter count is not zero at step 186, the program jumps around step 187 to step 188.

Then, the loop count is examined at step 188 to determine if it is greater than zero. If so, the program execution returns to step 181 to process the next image element in search of the edge. The loop count will be zero at step 188 when the edge is found or the end of the line gauge is encountered. At this occurrence, the analysis routine ends.

Next, the line gauge analysis value is compared with the upper and lower value limits stored in the line gauge data table 69 to determine whether the value is within the limits at step 159. At this point the line gauge analysis value also is compared to its predefined nominal value in the data table 69. If the analysis value is outside the defined range of values, or if it has deviated from the nominal value by more than a given amount, the respective range alarm flags for the selected line gauge in the analysis data table 70 are set at step 160. The analysis value is then stored within the corresponding word of this same data table at step 161. The line gauge counter is incremented at step 162 to designate the next line gauge for processing. This new counter value is examined by the microcomputer 30 at step 163 to determine if all of the line gauges have been analyzed. If not, the program returns to step 154 to repeat the analysis process for the next line gauge.

After the image has been analyzed with each of the line gauges, the interrupt routine advances to step 164 on FIG. 10C where the arithmetic operation is performed. This operation, which is specified in the analysis data table 70 (FIG. 4), applies a mathematical function to selected line gauge analysis values. For example, one line gauge analysis value can be subtracted from another. The result of the arithmetic operation is stored in word 5 of the analysis values data table 70. At step 165, the computed arithmetic operation value is compared to the defined upper and lower limits and a range alarm flag bit is set accordingly at step 166.

The program then advances to step 167, where the new image inspection results are coupled to the processor outputs. Specifically, the analog output designation within the output data table 71 is inspected to determine which one, if any, of the line gauges has been assigned to that output. If the analog output is enabled by the assignment of a line gauge, the program branches to step 168 where the electric current level for the analog output is computed. To do so, the analysis value of the selected line gauge is compared to its range limits. The results of the comparison are represented by an output word which digitally corresponds to the output current level. The output word will be set to all zeros or ones if the analysis value is below or above the value limit range respectively. Otherwise, the output word will be set to a number between one and 2047, which is proportional to the analysis value of the selected line gauge. The output word is then stored both in a temporary storage location within RAM 35 and a set of data latches within the analog result output circuit 48 at step 169. The analog result output circuit 48 converts the stored word into a proportional analog current between four and twenty milliamperes, which is applied to output terminals of the processor 20.

At step 170, the two decision output bytes in the output data table 70 are examined to determine whether either of them is enabled and which line gauges are to be used in determining the decision result. If the decision outputs are enabled, the range alarm flags for the designated line gauges are inspected and the flag bits are stored in corresponding the output data latches 37 to produce a output bit indicating whether the image passed of failed the defined inspection function. After the analog and the digital decision outputs have been set, the microcomputer 30 sets a bit in another output data latch 37 which indicates that the outputs are valid at step 172. Once the output valid bit has been set, the image acquisition and analysis interrupt routine terminates and the microcomputer 30 resumes execution at the point in the main loop program (FIG. 5) at which it was interrupted.

In response to output valid bit signal, the programmable controller 10 in FIG. 1 reads the decision output bits via the dc input module 16 and the analog result current level via the analog input module 15. In addition the programmable controller access the serial communication module 19 enabling it to send and receive data through the image processor's serial port. In this case the programmable controller 10 can obtain the complete set of line gauge analysis values and the range alarm flag bits from the image processor 20 for further evaluation.

We claim:

1. An image processor comprising: a data bus divided into first and second sections;
   an address bus divided into first, second and third sections;
   an analog to digital converter, coupled to the second section of said data bus, for receiving an analog signal representing an image to be processed and for producing digitized representations of image elements of the image;
   a first memory means coupled to the second section of said data bus for storing the digitized representations of the image elements;
   a first means, coupled to the second section of said address bus, for addressing said first memory means;
   means for generating a first coupling signal whenever the first means for addressing is not addressing said first memory means;
   a first means, responsive to the first coupling signal, for coupling the first and second sections of said data bus together and for coupling the first and second sections of said address bus together;
   means, coupled to the first sections of said address and data buses, for processing the digitized representations of the image elements;
   a second memory means coupled to the third section of said address bus and to the second section of said data bus for storing video image data;
   a second means, coupled to the third section of said address bus, for addressing said second memory means;
   means for generating a second coupling signal whenever the second means for addressing is not addressing said second memory means; and
   a second means for coupling the first and third sections of said address bus together in response to a second coupling signal.

2. The image processor as recited in claim 1 further comprising an image sensor which produces an analog signal that is coupled to said analog to digital converter, and having a plurality of image element sites for holding a charge proportional to the amount of light impinging upon the sensor over time.

3. The image processor as recited in claim 2 further comprising means for selectively defining the amount of time that the charge accumulates in the image element sites of said image sensor.

4. The image processor as recited in claim 1 wherein said means for processing the digitized representations of the image elements comprises a memory and a microprocessor for respectively storing and executing an image analysis program.

5. The image processor as recited in claim 4 wherein said image analysis program includes means for numerically processing the image elements; and for performing an arithmetic operation on the results of the numerical processing.

6. The image processor as recited in claim 1 further comprising means for generating an analog signal having a magnitude which varies in response to said means for processing the digitized representations of the image elements.

7. The image processor as recited in claim 1 further comprising means for generating a digital output signal in response to said means for processing the digitized representations of the image elements.

8. The image processor as recited in claim 1 further comprising means for periodically enabling said first memory means to store image elements of an image, such enabling being at a selectable interval from the previous enabling.

9. An image processor comprising:
   a light sensor means for producing a signal representing a series of image elements in a linear image;
   means for storing the luminance level of each of the series of image elements from said sensor means;
   means for processing the luminance levels of the series of image elements to produce a video image having a first format displaying a compressed representation of the full linear image, a second format displaying a selected portion of the linear image.

10. The image processor as recited in claim 9 wherein the first and second image formats display a representation of the luminance levels of selected image elements.

11. The image processor as recited in claim 10 wherein each of the first and second image formats is a two dimensional graph with the selected image elements being represented at a position on the graph having a coordinate along a first axis which corresponds to the position of the image element in the linear image, and a coordinate along a second axis corresponds to the luminance level of that image element.

12. The image processor as recited in claim 10 wherein the video image further comprises a third format displaying a binary representation of the selected image elements of the second format.

13. An image processor comprising:
   an analog to digital converter for receiving an analog signal representing an image to be processed and for generating digitized representations of image elements of the image;

an first memory coupled to said analog to digital converter for storing the digitized representations of the image elements of the image;

means for addressing said first memory;

means for analyzing the digitized representations of the image elements to produce at least one analysis result;

a video output circuit having a second memory for storing video image data representing the image elements, means for addressing said second memory, and means for generating a video signal from the video image data; and a first output means for producing an analog signal having a magnitude which represents one analysis result.

14. The image processor as recited in claim 13 further comprising a second output means for producing a digital signal having a magnitude which represents another analysis result.

15. The image processor as recited in claim 13 further comprising a linear image sensor coupled to an input of said analog to digital converter.

16. The image processor as recited in claim 13 further comprising means for periodically enabling said first memory to store the digitized representations of the image elements, such enabling occurring at selectable intervals.

17. The image processor as recited in claim 13 further comprising means for enabling said first memory to store the digitized representations of the image elements and having a timer means, such enabling being in response to either an externally produced signal or to a signal from the timer means.

18. The image processor as recited in claim 13 further comprising:

a charge coupled device image sensor which accumulates charge in each of a plurality of image element sites in response to the amount of light striking each site, said image sensor being coupled to said analog to digital converter; and means for varying the time interval during which charge accumulates in the image elements sites of said image sensor.

19. The image processor as recited in claim 13 wherein said means for analyzing produces a two numerical results and includes means for performing an arithmetic operation on the numerical results.

20. The image processor as recited in claim 13 wherein said means for analyzing includes means for limiting the analysis to sections of the image having at least a predetermined number of contiguous image elements which have a predefined common characteristic.

* * * * *